United States Patent
Majima (10) Patent No.: US 10,415,529 B2
(45) Date of Patent: Sep. 17, 2019

(54) CONTROLLER FOR VEHICLE

(71) Applicant: TOYOTA JIDOSHA KABUSHIKI KAISHA, Toyota-shi (JP)

(72) Inventor: Hiroshi Majima, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 45 days.

(21) Appl. No.: 15/857,970

(22) Filed: Dec. 29, 2017

(65) Prior Publication Data

US 2018/0202408 A1 Jul. 19, 2018

(30) Foreign Application Priority Data

Jan. 13, 2017 (JP) ................................. 2017-003933

(51) Int. Cl.
*F02N 11/08* (2006.01)
*B60W 30/18* (2012.01)
(Continued)

(52) U.S. Cl.
CPC ... *F02N 11/0825* (2013.01); *B60W 30/18018* (2013.01); *B60W 30/192* (2013.01); *F02N 11/0837* (2013.01); *F02N 11/0848* (2013.01); *F02N 11/006* (2013.01); *F02N 11/04* (2013.01); *F02N 11/0866* (2013.01);
(Continued)

(58) Field of Classification Search
CPC ............. F02N 11/0825; F02N 11/0837; F02N 11/0848; F02N 2200/124; F02N 2200/12; F02N 11/006; F02N 2011/0896; F02N 2011/0888; F02N 11/0866; F02N 11/04;
(Continued)

(56) References Cited

U.S. PATENT DOCUMENTS 4,286,683 A * 9/1981 Zeigner .................. B60K 15/00
123/179.4
4,453,506 A * 6/1984 Ueda ....................... F02D 37/02
123/179.16
(Continued)

FOREIGN PATENT DOCUMENTS

DE 102011114962 A1 * 4/2012 ............ F02N 11/084
DE 102012215497 A1 * 3/2013 .......... F02N 11/0825
(Continued)

*Primary Examiner* — Joseph J Dallo
(74) *Attorney, Agent, or Firm* — Oblon, McClelland, Maier & Neustadt, L.L.P.

(57) ABSTRACT

There is provided a controller for a vehicle that can execute, while the vehicle is stationary or moving, control of automatically stopping an engine upon determining that automatic stop conditions are met, and automatically restarting the engine upon determining that automatic restart conditions are met while automatic engine stop is in effect. At a time of first engine restart in one trip, the controller diagnoses whether a system that automatically restarts the engine is normal or abnormal. The automatic stop conditions for in-motion automatic engine stop include automatic stop execution conditions that are set based on a state of the vehicle, and automatic stop permit conditions that are set based on a travel environment. The controller sets the automatic stop permit conditions such that determination criteria are more stringent as a cumulative number of times of in-motion automatic engine stop in one trip is smaller.

10 Claims, 6 Drawing Sheets

(51) Int. Cl.
*B60W 30/192* (2012.01)
*F02N 11/00* (2006.01)
*F02N 11/04* (2006.01)

(52) U.S. Cl.
CPC ............ *F02N 2011/0888* (2013.01); *F02N 2011/0896* (2013.01); *F02N 2200/12* (2013.01); *F02N 2200/124* (2013.01); *Y02T 10/48* (2013.01)

(58) Field of Classification Search
CPC .......... B60W 30/18018; B60W 30/192; Y02T 10/48
See application file for complete search history.

(56) References Cited

U.S. PATENT DOCUMENTS

| | | | | |
|---|---|---|---|---|
| 6,334,834 | B1* | 1/2002 | Mizutani | B60T 13/585 477/203 |
| 6,555,927 | B1* | 4/2003 | Suzuki | B60K 6/365 290/34 |
| 7,458,353 | B2* | 12/2008 | Takahashi | F02D 17/04 123/179.3 |
| 9,145,126 | B2* | 9/2015 | Kinoshita | B60K 28/12 |
| 9,957,941 | B1* | 5/2018 | Gerty | F02D 41/042 |
| 2003/0089326 | A1* | 5/2003 | Ujifusa | F02N 11/0814 123/179.4 |
| 2009/0241883 | A1* | 10/2009 | Nagoshi | F02N 11/0825 123/179.4 |
| 2011/0203410 | A1* | 8/2011 | Notani | F02N 11/0851 74/7 R |
| 2012/0010792 | A1* | 1/2012 | Nedorezov | B60W 10/06 701/54 |
| 2012/0303251 | A1* | 11/2012 | Shimizu | F02D 13/0238 701/113 |
| 2014/0067241 | A1* | 3/2014 | Yuhara | F02D 45/00 701/112 |
| 2015/0204255 | A1* | 7/2015 | Seguchi | F02N 11/0822 701/113 |
| 2015/0226147 | A1* | 8/2015 | Hirabayashi | F02D 41/403 701/103 |
| 2016/0001779 | A1* | 1/2016 | Enomoto | F02D 41/1401 701/70 |
| 2017/0089314 | A1* | 3/2017 | Books | B60W 20/13 |
| 2017/0089315 | A1* | 3/2017 | Fujita | F02D 9/02 |
| 2018/0149106 | A1* | 5/2018 | Fujita | F02N 11/08 |
| 2018/0223788 | A1* | 8/2018 | Gerty | F02N 11/0844 |

FOREIGN PATENT DOCUMENTS

| | | | |
|---|---|---|---|
| EP | 2808536 A2 | 3/2014 | |
| JP | 59007749 A * | 1/1984 | .......... F02N 11/0833 |
| JP | 11351003 A * | 12/1999 | .......... F02N 11/0818 |
| JP | 2011-196288 | 10/2011 | |
| JP | 2013-136288 A | 7/2013 | |
| JP | 2014-234748 A | 12/2014 | |
| JP | 2016-061247 A | 4/2016 | |
| JP | 2016-148256 A | 8/2016 | |
| JP | 2016-194253 A | 11/2016 | |

* cited by examiner

CONTROLLER FOR VEHICLE

CROSS-REFERENCE TO RELATED APPLICATIONS

This application claims priority to Japanese Patent Application No. 2017-003933 filed on Jan. 13, 2017, which is incorporated herein by reference in its entirety.

BACKGROUND

1. Technical Field

The present disclosure relates to a controller for a vehicle, and more particularly to a controller that is installed in a vehicle capable of automatically stopping and restarting the engine while moving.

2. Description of Related Art

To improve fuel efficiency, so-called stop and start control (hereinafter referred to as "S&S control") of automatically stopping the engine when predetermined automatic stop conditions are met, and automatically restarting the engine when predetermined automatic restart conditions are met while automatic engine stop is in effect has been conventionally adopted. Known examples of such "S&S control" include, other than "stationary S&S control" of automatically stopping the engine while the vehicle is stationary, "free-running S&S control" of allowing the vehicle to coast by disconnecting the engine and the driving wheels and automatically stopping the engine while the vehicle is moving with the accelerator released.

As these modes of "S&S control" involve stopping the engine even temporarily, it is required to periodically diagnose whether a system that automatically restarts the engine (hereinafter also referred to as an engine restart system) is normal or abnormal. To make such a diagnosis with high accuracy, it is desirable that the engine restart system be diagnosed when it is actually activated. Therefore, in vehicles that execute "S&S control", whether the engine restart system is normal or abnormal is commonly diagnosed at the time of the first engine restart after the first automatic engine stop in each trip (from turning on to turning off of the ignition).

However, unlike "stationary S&S control" that is executed while the vehicle is stationary, "free-running S&S control" is executed while the vehicle is moving. Thus, the driver may feel anxiety if the engine restart system should be found abnormal. In view of this, for example, Japanese Patent Application Publication No. 2011-196288 discloses a device for diagnosing abnormality of an idle-stop system that automatically stops and restarts an engine. When the first automatic stop is demanded, this device prohibits in-motion automatic engine stop, and automatically stops the engine on the condition that the vehicle speed is zero.

SUMMARY

However, according to the device described in JP 2011-196288 A, "free-running S&S control" is not executed until the first stop of the vehicle after the ignition is turned on and the vehicle starts moving. Thus, when a situation where the vehicle stops does not arise for some time, such as when the vehicle has just moved out of a rest area of a highway, it is difficult to produce the effect of improvement in fuel efficiency despite the vehicle having the function of "free-running S&S control".

Then, it is conceivable to diagnose whether the engine restart system is normal or abnormal by permitting the first automatic engine stop even while the vehicle is moving. However, if the first automatic engine stop while the vehicle is moving is readily permitted, the driver may feel anxiety if the engine restart system should be found abnormal, for example, in a situation where the distance to a vehicle in front is short.

Having been devised in view of this problem, the present disclosure provides a technique that is applied to a vehicle capable of automatically stopping and restarting the engine while moving, and can safely diagnose whether the engine restart system is normal or abnormal, without giving the driver anxiety, while achieving improvement in fuel efficiency.

In a controller for a vehicle according to one aspect of the present disclosure, conditions for in-motion automatic stop include, other than general conditions that are based on the state of the own vehicle, automatic stop permit conditions that are conditions based on a travel environment around the own vehicle. Determination criteria of the automatic stop permit conditions based on the travel environment are set to be relatively stringent for the first automatic engine stop.

Specifically, a controller for a vehicle including an electronic control unit is provided. This electronic control unit is configured to: (i) execute, while the vehicle is stationary or moving, control of automatically stopping an engine upon determining that automatic stop conditions are met, and automatically restarting the engine upon determining that automatic restart conditions are met while automatic engine stop is in effect; (ii) diagnose, at a time of engine restart after first automatic engine stop in one trip from turning on to turning off of an ignition, whether a system that automatically restarts the engine is normal or abnormal; (iii) include, as the automatic stop conditions for in-motion automatic engine stop, automatic stop execution conditions that are set based on a state of the own vehicle, and automatic stop permit conditions that are set based on a travel environment around the own vehicle; and (iv) set the automatic stop permit conditions such that determination criteria are more stringent as a cumulative number of times of in-motion automatic engine stop in the one trip is smaller.

In the present disclosure, the automatic stop execution conditions that are set based on the state of the own vehicle mean positive conditions for in-motion automatic engine stop (hereinafter also referred to as in-motion engine stop), such as that the accelerator is released, that are set based on the state of the vehicle itself regardless of the peripheral situation.

By contrast, the automatic stop permit conditions that are set based on the travel environment around the own vehicle mean passive conditions, such as that the distance to a vehicle in front or the distance to an obstacle is sufficiently long, that are set based on correlations with the peripheral situation. Unless these conditions are met, in-motion engine stop is prohibited even when the automatic stop execution conditions are met.

According to the above configuration of the controller, upon determining that the automatic stop conditions are met, the electronic control unit automatically stops the engine for the first time regardless of whether the vehicle is stationary or moving. Thus, whether the system that automatically restarts the engine (hereinafter also referred to as an engine restart system) is normal or abnormal can be diagnosed even while the vehicle is moving. This makes it possible to execute "free-running S&S control" even when a situation where the vehicle stops does not arise for some time after the vehicle starts moving, which contributes to improvement in fuel efficiency.

The conditions for in-motion automatic stop include the automatic stop permit conditions that are set based on the travel environment, and these automatic stop permit conditions are set such that the determination criteria are more stringent as the cumulative number of times of in-motion engine stop in one trip is smaller. Accordingly, the determination criteria are relatively stringent for the first in-motion engine stop. Specifically, the determination criteria, such as that the distance to a vehicle in front or the distance to an obstacle is sufficiently long, of the permit conditions for the first automatic stop in one trip are corrected to be more stringent. Therefore, even if it is diagnosed at the time of the first engine restart that the engine restart system is abnormal and cannot restart the engine normally, the driver has enough time, for example, to pull over to the shoulder in a limp home mode. Thus, it is possible to secure safety and avoid giving the driver anxiety.

To put it the other way around, that the determination criteria are more stringent as the cumulative number of times of in-motion engine stop in one trip is smaller means that the determination criteria are less stringent as the cumulative number of times of in-motion engine stop in one trip is larger. Accordingly, after the engine restart system is diagnosed to be normal at the time of the first engine restart, the frequency of in-motion engine stop increases as the driver gets more used to the engine stopping while the vehicle is moving, which contributes to improvement in drivability and fuel efficiency.

In the above controller, the electronic control unit may be configured to set the automatic stop permit conditions for second and automatic engine stop and automatic engine stop after the second automatic engine stop in one trip such that determination criteria are more stringent as a total number of times of in-motion automatic engine stop over a period from when the vehicle was new to the present time is smaller.

The driver usually gets more used to the engine stopping while the vehicle is moving, as the driver has more experience of in-motion automatic engine stop. In the above configuration of the controller, the total number of times of in-motion automatic engine stop is reflected for in-motion automatic engine stop among the second and subsequent automatic engine stop in one trip. Accordingly, the determination criteria for the same k-time (k is a positive integer) in-motion engine stop in one trip are relatively more stringent if the vehicle is newer. Thus, it is possible to avoid giving anxiety to a driver who is not used to driving the vehicle. On the other hand, the determination criteria become relatively less stringent as the driver gets more used to driving the vehicle, which contributes to improvement in drivability and fuel efficiency.

However, the total number of times of in-motion automatic engine stop is not reflected for the first automatic engine stop that is associated with the diagnosis on whether the engine restart system is normal or abnormal, since the relation that the driver gets more used to in-motion automatic engine stop as the driver has more experience thereof does not apply here. Therefore, in accordance with the principle, the determination criteria are relatively stringent when the engine is automatically stopped for the first time while the vehicle is moving. Thus, it is possible to safely diagnose whether the engine restart system is normal or abnormal without giving the driver anxiety.

Moreover, the automatic stop permit conditions may include at least one of the following: the distance between the own vehicle and a peripheral object present around the own vehicle is not equal to or longer than a predetermined distance; the speed of the own vehicle relative to a peripheral object present around the own vehicle is equal to or lower than a predetermined speed; and the gradient of a road on which the own vehicle is moving is equal to or smaller than a predetermined gradient.

According to the above configuration of the controller, whether the engine restart system is normal or abnormal can be diagnosed, for example, in a situation where the distance between the own vehicle and a peripheral object is long, a situation where the own vehicle is slowly moving closer to (or away from) a peripheral object, or a situation where the vehicle is moving on a road with a gentle gradient. In other words, even if the engine restart system is diagnosed to be abnormal, for example, failure of the engine brake can be avoided, for example, in a situation where the distance between the own vehicle and a peripheral object is short, a situation where the own vehicle is rapidly moving closer to a peripheral object, or a situation where the vehicle is moving on a road with a steep gradient.

In the above controller, the automatic stop permit conditions may include that the distance between the own vehicle and a peripheral object present around the own vehicle is equal to or longer than a predetermined distance, and the controller may set the predetermined distance to be longer as the cumulative number of times of in-motion automatic engine stop in one trip is smaller.

According to the above configuration of the controller, the predetermined distance is set to be long for the first in-motion engine stop. Thus, it is possible to safely diagnose whether the engine restart system is normal or abnormal without giving the driver anxiety in a situation where the distance between the own vehicle and a peripheral object is long.

In the above controller, the automatic stop permit conditions may include that the speed of the own vehicle relative to a peripheral object present around the own vehicle is equal to or lower than a predetermined speed, and the controller may set the predetermined speed to be lower as the cumulative number of times of in-motion automatic engine stop in one trip is smaller.

According to the above configuration of the controller, the predetermined speed is set to be low for the first in-motion engine stop. Thus, it is possible to safely diagnose whether the engine restart system is normal or abnormal without giving the driver anxiety in a situation where the speed of the own vehicle relative to a peripheral object is low.

Moreover, in the above controller, the automatic stop permit conditions may include that the gradient of a road on which the vehicle is moving is equal to or smaller than a predetermined gradient, and the controller may set the predetermined gradient to be smaller as the cumulative number of times of in-motion automatic engine stop in one trip is smaller.

According to the above configuration of the controller, the predetermined gradient is set to be small for the first in-motion engine stop. Thus, it is possible to safely diagnose whether the engine restart system is normal or abnormal without giving the driver anxiety in a situation where the gradient of a road on which the vehicle is moving is small.

The controller may further include a plurality of restart devices. These plurality of restart devices may be configured to automatically restart the engine. The electronic control unit may be configured to, when the engine has failed to be restarted by a principal restart device of the plurality of restart devices, attempt restart of the engine by another restart device of the plurality of restart devices.

According to the above configuration of the controller, when the engine is automatically stopped for the first time while the vehicle is moving, even if the engine restart system is found abnormal and the engine cannot be restarted normally by the principle restart device, the engine can be restarted by another restart device. Also in this case, the determination criteria, such as that the distance to a vehicle in front is sufficiently long, are set to be relatively stringent for the first in-motion engine stop. Thus, it is possible to avoid giving the driver anxiety even when there is a time lag between failure of engine restart by the principal restart device and engine restart by another restart device.

Alternatively, the above controller may include a single restart device. This single restart device may be configured to automatically restart the engine. The electronic control unit may be configured to inform a diagnostic result of whether or not the automatic stop conditions are met to a driver of the vehicle.

According to the above configuration of the controller, when the engine has failed to be restarted by the restart device, it is possible to allow the driver to have enough time to pull over to the shoulder in a limp home mode by informing the diagnostic result to the driver. Thus, it is possible to secure safety and avoid giving the driver anxiety.

In the above controller, the restart devices may include at least one of the following: a device that starts the engine by using a motor-generator; a device that starts the engine by using a starter motor; a device that starts the engine by injecting fuel into a cylinder of the engine in which a piston of the engine is stopped during an expansion stroke and by igniting the fuel; and a device that starts the engine by using rotary energy of a driving wheel.

According to the above configuration of the controller, it is possible to appropriately restart the engine after automatic engine stop.

As has been described above, according to the controller for a vehicle of the present disclosure, it is possible to safely diagnose whether the engine restart system is normal or abnormal, without giving the driver anxiety, while achieving improvement in fuel efficiency.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will be described below based on the drawings.

Figure 1:
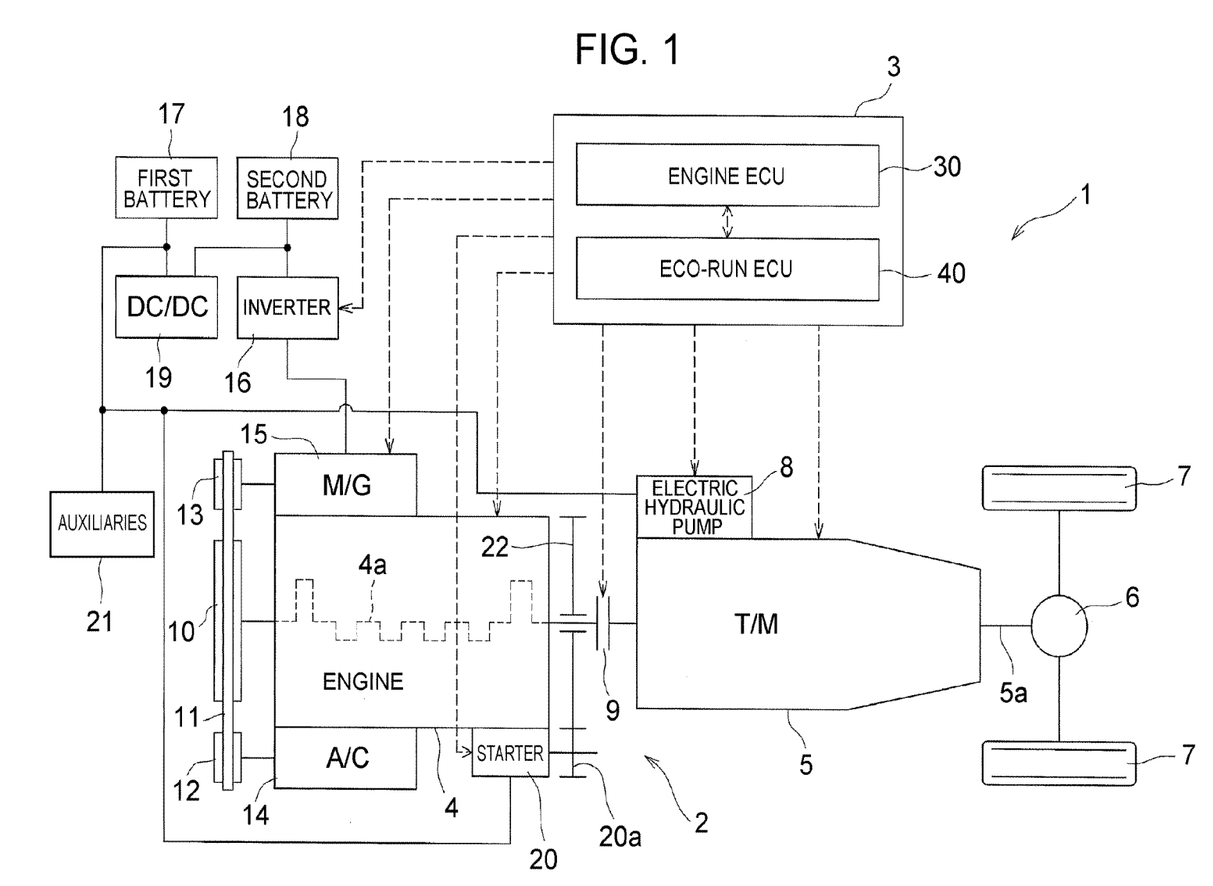
FIG. 1 is a view schematically showing main parts of a vehicle according to an embodiment of the present disclosure.

First, the overall configuration of a vehicle to which a controller of the embodiment of the present disclosure is applied will be described. FIG. 1 is a view showing main parts of a vehicle 1. As shown in FIG. 1, the vehicle 1 is configured as a front-engine, rear-wheel-drive (FR) vehicle that includes: an engine 4 and an automatic transmission 5 as a driving device 2; an engine ECU 30 and an economic run (eco-run) ECU 40 (hereinafter referred to simply as the eco-run ECU 40) as a controller 3; a motor-generator 15 and a starter motor 20 that start the engine 4; and first and second batteries 17, 18 that supply electric power to electronic components such as the motor-generator 15 and the starter motor 20.

In the vehicle 1, a driving force (torque) output from a crankshaft 4a of the engine 4 serving as a driving force source is output from an output shaft 5a after the speed thereof is changed by the automatic transmission 5 to an appropriate gear ratio, and this driving force is finally transmitted to right and left driving wheels 7, 7 through a differential gear device 6. For example, the engine ECU 30 controls the engine 4 and controls gear change in the automatic transmission 5, and the eco-run ECU 40 executes so-called stop and start control ("S&S control"). The motor-generator 15 functions as principal restart means at the time of engine restart under "S&S control", and the starter motor 20 functions as secondary restart means in case the engine fails to be restarted by the motor-generator 15.

The engine 4 is configured as a gasoline engine having an electronic throttle valve 23 (see FIG. 2), a fuel injection valve 24 (see FIG. 2), an igniter 25 (see FIG. 2), etc. The electronic throttle valve 23 is used to control the amount of intake air. The fuel injection valve 24 is used to control the amount and timing of fuel supply. The igniter 25 is used to control the ignition timing. The electronic throttle valve 23, the fuel injection valve 24, and the igniter 25 are basically controlled by the controller 3 (engine ECU 30) according to the amount of operation of an accelerator pedal (not shown) by a driver.

The automatic transmission 5 is configured as a planetary gear multistage transmission that establishes a plurality of gear positions with different gear ratios according to engagement and disengagement of a plurality of clutches and a brake. The automatic transmission 5 is provided with an electric hydraulic pump 8 to which electric power is supplied from the first battery 17, and a working fluid is supplied from the electric hydraulic pump 8 to an oil pressure control unit (not shown) inside the automatic transmission 5. In the automatic transmission 5, engagement and disengagement of the clutches and the brake are adjusted by means of this working fluid through a control valve (not shown) inside the oil pressure control unit, and thereby the shift position is switched according to the operation of the accelerator by the driver, the vehicle speed, etc.

A clutch 9 is provided between the engine 4 and the automatic transmission 5, independently of the automatic transmission 5. The clutch 9 connects and disconnects the engine 4 and the driving wheels 7, 7 and thus functions as an input clutch for the automatic transmission 5. Engagement and disengagement of the clutch 9 is controlled by means of the working fluid supplied from the electric hydraulic pump 8.

Separately from this driving force transmission system from the engine 4 to the driving wheels 7, 7, the driving force output from the engine 4 is transmitted to a belt 11 through a pulley 10 connected to the crankshaft 4a, and a pulley 12 coupled to a compressor 14 of an air conditioner and a pulley 13 coupled to the motor-generator 15 are rotated by the driving force transmitted to the belt 11.

The motor-generator 15 is configured to be able to switch between a regeneration mode and a driving mode. In the regeneration mode, the motor-generator 15 functions as a power generator and converts the driving force transmitted thereto through the pulley 13 into electric energy. On the other hand, in the driving mode, the motor-generator 15 functions as a motor and rotates the crankshaft 4a of the engine 4 through the pulley 13, the belt 11, and the pulley 10. The motor-generator 15 is electrically connected to an inverter 16.

The inverter 16 is controlled by the controller 3, and the regeneration mode and the driving mode of the motor-generator 15 are switched through this control of the inverter 16. To put the motor-generator 15 in the regeneration mode, the inverter 16 switches such that electric energy is charged from the motor-generator 15 to the second battery 18 (and to the first battery 17 through a DC-DC converter 19). On the other hand, to put the motor-generator 15 in the driving mode, the inverter 16 supplies electric power from the second battery 18 to the motor-generator 15, and thereby drives the motor-generator 15 and rotates the crankshaft 4a when the engine restarts or the vehicle starts moving after automatic engine stop, etc.

As electric power is supplied from the first battery 17 to the starter motor 20, a pinion gear 20a provided on an output shaft of the starter motor 20 is rotated, and the pinion gear 20a meshes with a ring gear provided on an outer circumference of a flywheel 22, which starts the engine 4. The starter motor 20 performs cranking of the engine 4 at the time of cold start and of start with operation of an ignition key by the driver, as well as at the time of restart after automatic engine stop.

The first battery 17 is a low-voltage power supply battery, and for example, is a secondary battery such as a lithium-ion battery, nickel-hydrogen battery, or lead-acid storage battery. The second battery 18 is a high-voltage power supply battery, and for example, is a secondary battery such as a lithium-ion battery, nickel-hydrogen battery, or lead-acid storage battery, or a capacitor. Electric power is supplied from the first battery 17 to the electric hydraulic pump 8 and the starter motor 20 described above, as well as to auxiliaries 21 (general electronic components) including an ignition system, meters, and various ECUs.

The vehicle 1 is further equipped with an advanced driver assistance system (ADAS) 50 (see FIG. 2) having a camera 51 that photographs a peripheral situation of the vehicle 1, a millimeter wave radar 52 that uses radio waves that can be used even in a foggy or rainy weather, a laser radar 53 that measures the distance, direction, etc. of an object from reflected light, and an infrared sensor 54 that takes out required information from an infrared ray it receives. Based on input signals from these sensors, the ADAS 50 detects the possibility of an accident etc. in advance and avoids such possibilities.

Figure 2:
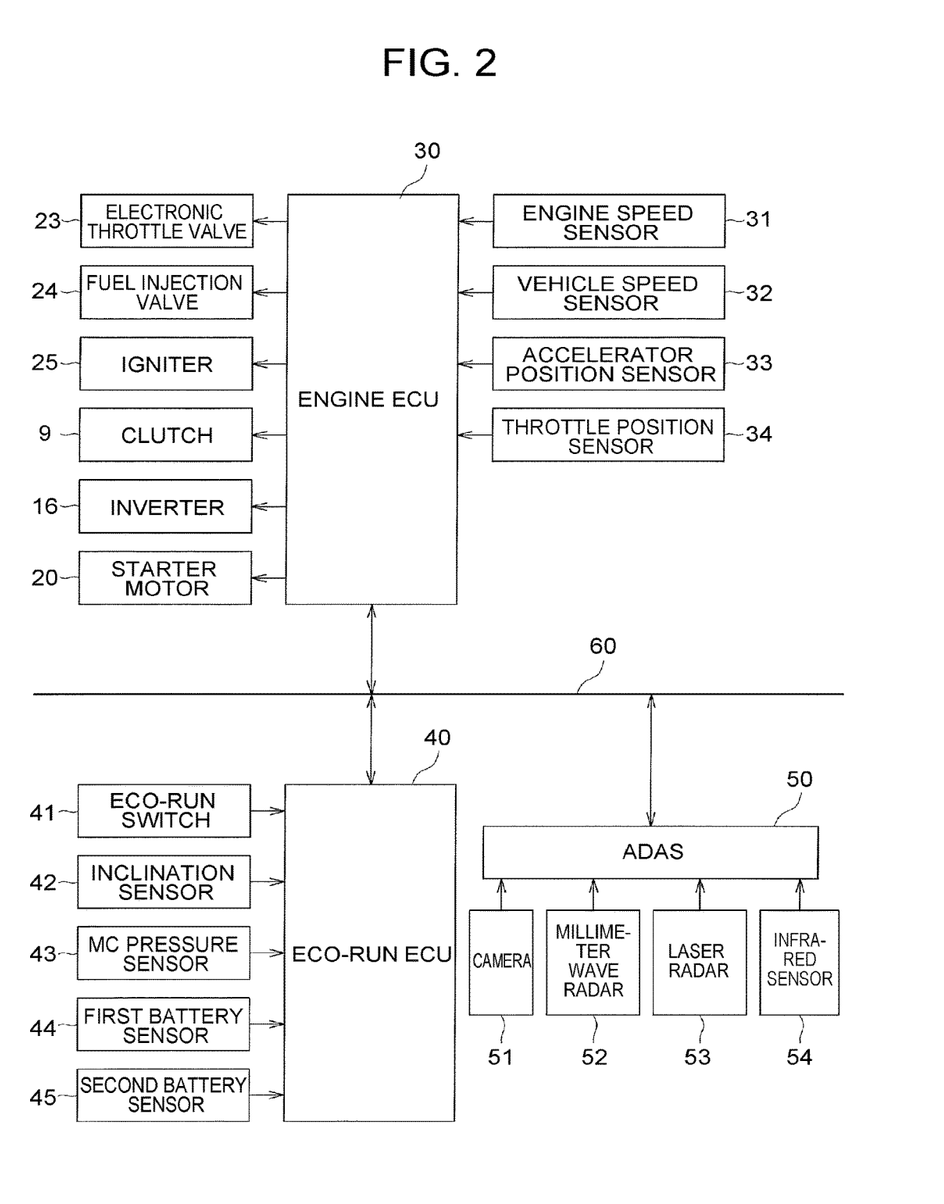
FIG. 2 is a block diagram schematically showing a control system.

Next, the controller for this vehicle will be described. FIG. 2 is a block diagram schematically showing a control system. The engine ECU 30 and the eco-run ECU 40 include a so-called microcomputer having, for example, a CPU, RAM, ROM, input-output interface, etc. The CPU executes various modes of control of the vehicle 1 by processing signals in accordance with a program that is stored in the ROM in advance while using a temporary storage function of the RAM. The engine ECU 30 and the eco-run ECU 40 are connected to each other through a CAN communication line 60 such that information can be exchanged therebetween.

<Engine ECU > For example, a signal representing an engine speed detected by an engine speed sensor 31, a signal representing a rotation speed of the output shaft 5a of the automatic transmission 5 corresponding to a vehicle speed detected by a vehicle speed sensor 32, a signal representing an accelerator operation amount detected by an accelerator position sensor 33, and a signal representing an opening degree of the electronic throttle valve 23 detected by a throttle position sensor 34 are input into the engine ECU 30.

Based on these input signals from the sensors, the engine ECU 30 outputs engine output control command signals for controlling the output of the engine 4, an oil pressure control command signal for controlling oil pressure related to gear change in the automatic transmission 5, an oil pressure control command signal to the clutch 9, a signal to the inverter 16 for controlling the mode of the motor-generator 15, a driving control signal to the starter motor 20, etc. The engine output control command signals include a throttle signal for controlling opening and closing of the electronic throttle valve 23, a signal for controlling the amount and timing of fuel injection from the fuel injection valve 24, and a signal for controlling the ignition timing of the igniter 25. Through these signals, the engine ECU 30 controls the output of the engine 4, gear change in the automatic transmission 5, oil pressure on the clutch 9, driving of the motor-generator 15, driving of the starter motor 20, etc.

Next, the eco-run ECU will be described. A signal representing on or off of an eco-run switch 41 corresponding to whether an "S&S control" system has been started by the driver, a signal representing the gradient of a road on which the vehicle 1 is currently moving that is detected by an inclination sensor 42, a signal representing on or off of the brake based on a detection result of an MC pressure sensor 43 that detects a master cylinder pressure of a brake master cylinder (not shown) generated according to a pressing force on a brake pedal (not shown), a signal representing a state (current, temperature, etc.) of the first battery 17 detected by a first battery sensor 44, a signal representing a state of the second battery 18 detected by a second battery sensor 45, etc. are input into the eco-run ECU 40. As the eco-run ECU 40 is connected to the engine ECU 30 through the CAN communication line 60, the above signals input into the engine ECU 30 are also input into the eco-run ECU 40. Moreover, as the eco-run ECU 40 is also connected to the ADAS 50 through the CAN communication line 60, the input signals from the camera 51, the millimeter wave radar 52, the laser radar 53, and the infrared sensor 54 are also input into the eco-run ECU 40.

Upon determining that automatic stop conditions are met based on these input signals from the sensors, the eco-run ECU 40 sends an engine stop command to the engine ECU 30. Accordingly, the engine ECU 30 disengages the clutch 9 to disconnect the engine 4 and the driving wheels 7, and executes fuel cut control of stopping fuel supply to a combustion chamber of the engine 4. On the other hand, upon determining that automatic restart conditions are met while automatic engine stop is in effect, the eco-run ECU 40 sends an engine restart command to the engine ECU 30. Accordingly, the engine ECU 30 starts fuel supply to the combustion chamber of the engine 4, and restarts the engine 4 by the restart means.

The eco-run ECU 40 of this embodiment is configured to be able to execute such control of automatically stopping and restarting the engine 4 while the vehicle is stationary or moving. Specifically, the eco-run ECU 40 is configured to be able to execute "stationary S&S control" of automatically stopping the engine 4 while the vehicle is stationary, and "free-running S&S control" of allowing the vehicle to coast by disconnecting the engine 4 and the driving wheels 7 and automatically stopping the engine 4 while the vehicle is moving with the accelerator released.

Here, examples of conditions for stationary automatic stop include: (a) the eco-run switch 41 is on; (b) the accelerator pedal is not pressed; (c) states of charge SOC of the first and second batteries 17, 18 meet their respective required levels; (d) the brake pedal is pressed down; and (e) the vehicle 1 is stationary (vehicle speed is 0 km/h). When all these conditions (a) to (e) are cleared, the eco-run ECU 40 determines that the conditions for stationary automatic stop are met. The eco-run ECU 40 calculates the states of charge SOC of the first and second batteries 17, 18 based on input signals from the first and second battery sensors 44, 45.

Examples of conditions for stationary automatic restart include that the accelerator pedal is pressed and the brake pedal is not pressed. When this condition is cleared while automatic engine stop is in effect, the eco-run ECU 40 determines that the conditions for stationary automatic restart are met, and sends an engine restart command to the engine ECU 30. Accordingly, the engine ECU 30 starts fuel supply to the combustion chamber of the engine 4, and restarts the engine 4 by the restart means.

On the other hand, conditions for in-motion automatic stop include automatic stop execution conditions that are set based on the state of the own vehicle 1 and automatic stop permit conditions that are set based on the travel environment around the own vehicle 1.

Here, the automatic stop execution conditions that are set based on the state of the own vehicle 1 mean positive conditions for in-motion automatic engine stop (hereinafter also referred to as in-motion engine stop), such as that the accelerator is released, that are set based on the state of the vehicle 1 itself regardless of the peripheral situation. Specific examples of the automatic stop execution conditions include: (A) the eco-run switch 41 is on; (B) the accelerator pedal is not pressed; and (C) the states of charge SOC of the first and second batteries 17, 18 meet their respective required levels. When all these conditions (A) to (C) are cleared, the eco-run ECU 40 determines that the automatic stop execution conditions are met.

By contrast, the automatic stop permit conditions that are set based on the travel environment around the own vehicle 1 mean passive conditions, such as that the distance to a vehicle in front or the distance to an obstacle is sufficiently long, that are set based on correlations with the peripheral situation. Unless these conditions are met, in-motion engine stop is prohibited even when the automatic stop execution conditions are met. Specific automatic stop permit conditions will be described later.

Upon determining that both the automatic stop execution conditions and the automatic stop permit conditions are met, the eco-run ECU 40 sends an engine stop command to the engine ECU 30. Accordingly, the engine ECU 30 allows the vehicle 1 to coast by disengaging the clutch 9 to disconnect the engine 4 and the driving wheels 7, and executing fuel cut control of stopping fuel supply to the combustion chamber of the engine 4.

Examples of conditions for in-motion automatic restart include that the accelerator pedal is pressed. When the accelerator pedal is pressed, the eco-run ECU 40 determines that the conditions for in-motion automatic restart are met, and sends an engine restart command to the engine ECU 30. Accordingly, the engine ECU 30 starts fuel supply to the combustion chamber of the engine 4, and restarts the engine 4 by the restart means.

Here, the vehicle 1 of this embodiment is configured to be able to automatically restart the engine 4 by a plurality of restart means. Specifically, the restart means include: (1) means for starting the engine 4 by using the motor-generator 15; (2) means for starting the engine 4 by using the starter motor 20; (3) means for starting the engine 4 by injecting fuel into a cylinder (not shown) in which a piston (not shown) is stopped during an expansion stroke and igniting the fuel (ignition start); and (4) means for starting the engine 4 by using rotary energy of the driving wheels 7 (push start).

Upon determining that the conditions for in-motion automatic restart are met, the eco-run ECU 40 sends a first engine restart command to the engine ECU 30 to attempt restart of the engine by the motor-generator 15 serving as the principal restart means. Specifically, electric power is supplied from the second battery 18 to the motor-generator 15 through control by the inverter 16, and the motor-generator 15 is driven to rotate the crankshaft 4a. If the second battery 18, the motor-generator 15, or the like is abnormal and the engine 4 fails to restart normally, the eco-run ECU 40 sends a second engine restart command to the engine ECU 30 to attempt restart of the engine by the starter motor 20.

Moreover, if the starter motor 20 or the like is also abnormal and the engine 4 fails to restart, the eco-run ECU 40 tries to restart the engine by ignition start or push start.

To perform ignition start, the eco-run ECU 40 determines which cylinder is stopped during an expansion stroke based on an input signal from the engine speed sensor 31. Then, the eco-run ECU 40 sends a third engine restart command to the engine ECU 30. Accordingly, the engine ECU 30 injects a predetermined amount of fuel by the fuel injection valve 24 into a combustion chamber of the cylinder that is stopped during an expansion stroke, and then ignites an air-fuel mixture by the igniter 25 to produce explosive force and drive the crankshaft 4a through the piston, thereby restarting the engine 4.

To perform push start, the eco-run ECU 40 sends a fourth engine restart command to the engine ECU 30 on the condition that the vehicle speed is not lower than a predetermined speed. Accordingly, the engine ECU 30 engages the clutch 9 to connect the engine 4 and the driving wheel 7, and restarts the engine 4 by using moving energy of the vehicle 1 that is produced through the driving wheels 7.

In relation with the claims, the motor-generator 15, the inverter 16, the first battery 17, the second battery 18, the DC-DC converter 19, the starter motor 20, etc. correspond to the system that automatically restarts the engine. Hereinafter, the motor-generator 15, the inverter 16, the first battery 17, the second battery 18, the DC-DC converter 19, the starter motor 20, etc. will be also referred to as an engine restart system.

Next, diagnosis on whether the engine restart system is normal or abnormal will be described. "S&S control" requires periodically diagnosing whether the engine restart system is normal or abnormal. To make such a diagnosis with high accuracy, it is desirable that the engine restart system be diagnosed when it is actually activated. Therefore, in vehicles that execute "S&S control", whether the engine restart system is normal or abnormal is commonly diagnosed at the time of the first engine restart after the first automatic engine stop in one trip (from turning on to turning off of the ignition).

However, unlike "stationary S&S control", "free-running S&S control" is executed while the vehicle is moving. Thus, the driver may feel anxiety if the engine restart system should be found abnormal. Therefore, it is conceivable to prohibit in-motion engine stop when the first automatic stop is demanded, and automatically stop the engine on the condition that the vehicle speed is zero.

However, according to this control method, "free-running S&S control" is not executed until the first stop of the vehicle after the ignition is turned on and the vehicle starts moving. Thus, it is difficult to produce the effect of improvement in fuel efficiency despite the vehicle having the function of "free-running S&S control".

In this embodiment, therefore, the eco-run ECU 40 is configured to diagnose whether the engine restart system is normal or abnormal at the time of the first engine restart after the first automatic engine stop in one trip from turning on to turning off of the ignition, and to set the automatic stop permit conditions such that determination criteria are more stringent as the cumulative number of times of in-motion automatic engine stop in one trip is smaller.

Specifically, the eco-run ECU 40 sets the permit conditions for the first automatic stop soon after the ignition is turned on. Examples of the automatic stop permit conditions include that the distance between the own vehicle 1 and a peripheral object (a vehicle in front, an obstacle, etc.) present around the own vehicle 1 (hereinafter also referred to as an inter-vehicle distance) is not shorter than a predetermined distance, and that the gradient of a road on which the own vehicle 1 is currently moving is not larger than a predetermined gradient.

Figure 3:
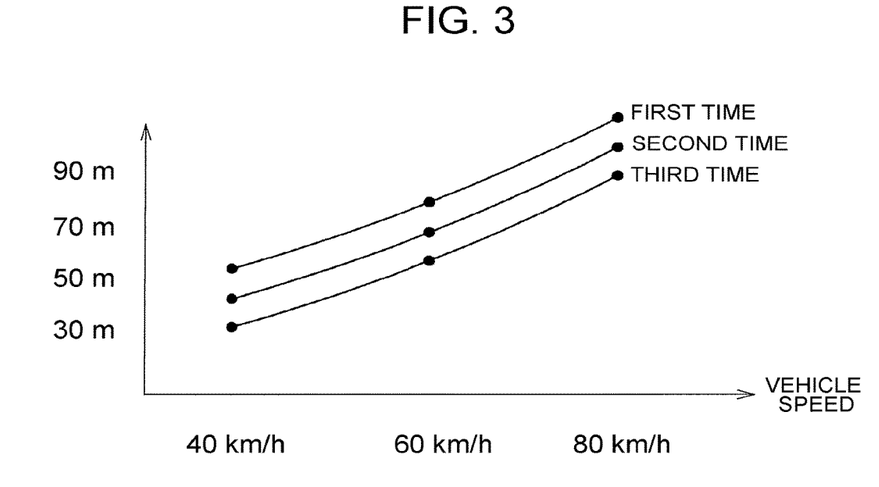
FIG. 3 is a view schematically showing an example of a control map related to an automatic stop permit condition.

For the condition that the inter-vehicle distance etc. are not shorter than the predetermined distance, for example, a control map as shown in FIG. 3 is stored in the ROM, and the eco-run ECU 40 sets the permit conditions for the first automatic stop based on this control map. Accordingly, for example, when the vehicle is moving at the same speed of 60 km/h, third in-motion automatic engine stop in one trip is permitted if the inter-vehicle distance is 60 m or longer, whereas the second in-motion automatic engine stop is not permitted unless the inter-vehicle distance is 70 m or longer. Moreover, the first in-motion automatic engine stop is not permitted unless the inter-vehicle distance is 80 m or longer. Thus, if the vehicle speed is the same, the predetermined distance is set to be longer as the cumulative number of times of in-motion engine stop in one trip is smaller.

Figure 4:
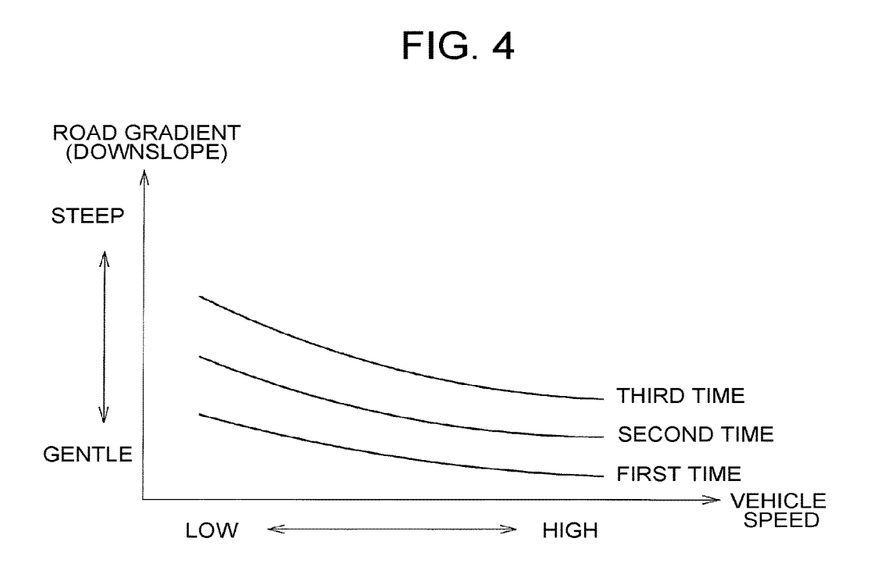
FIG. 4 is a view schematically showing an example of a control map related to another automatic stop permit condition.

For the condition that the gradient of the road is not larger than the predetermined gradient, for example, a control map as shown in FIG. 4 is stored in the ROM, and the eco-run ECU 40 sets the permit conditions for the first automatic stop based on this control map. Accordingly, for example, when the vehicle is moving on a downslope, the second in-motion automatic engine stop in one trip is permitted only on a road with a gentler gradient than the third in-motion automatic engine stop. Moreover, the first in-motion automatic engine stop is permitted only on a road with a gentler gradient than the second in-motion automatic engine stop.

Thus, the eco-run ECU 40 sets the automatic stop permit conditions such that the determination criteria are more stringent as the cumulative number of times of in-motion engine stop in one trip is smaller. Accordingly, the determination criteria for the first in-motion engine stop at the time of which the engine restart system is diagnosed are always corrected to be more stringent. This makes it possible to avoid giving the driver anxiety, even if it is diagnosed at the time of the first engine restart that the engine restart system is abnormal and cannot restart the engine normally. Specifically, the first in-motion engine stop is permitted in a situation where the inter-vehicle distance etc. are sufficiently long and the gradient of the road is gentle. Therefore, it is possible to avoid giving the driver anxiety, for example, even when there is a time lag between failure of engine restart by the motor-generator 15 and restart of the engine 4 by the starter motor 20.

Upon determining that the automatic stop execution conditions are met, the eco-run ECU 40 determines whether the inter-vehicle distance etc. are not shorter than the predetermined distance based on input signals from the vehicle speed sensor 32 and the ADAS 50, and whether the gradient of the road is not larger than the predetermined gradient based on input signals from the vehicle speed sensor 32 and the inclination sensor 42. In other words, the eco-run ECU 40 determines whether the automatic stop permit conditions are met. Upon determining that both the automatic stop execution conditions and the automatic stop permit conditions are met, the eco-run ECU 40 sends an engine stop command to the engine ECU 30 to allow the vehicle 1 to coast.

If the driver presses the accelerator pedal while the vehicle is thus coasting, the eco-run ECU 40 determines that the conditions for in-motion automatic restart are met, and sends a first engine restart command to the engine ECU 30. Thus, the eco-run ECU 40 tries to restart the engine 4 by the motor-generator 15, and diagnoses whether the engine restart system is normal or abnormal.

For example, the eco-run ECU 40 detects an output voltage of the second battery 18, and determines that the second battery 18 is abnormal if the detected value is lower than a predetermined value. Even when the eco-run ECU 40 has diagnosed the second battery 18 to be normal, for example, the eco-run ECU 40 acquires the engine speed after a predetermined time has elapsed since the first engine restart command is sent based on an input signal from the engine speed sensor 31, and diagnoses that engine restart has failed, in other words, the motor-generator 15 or the like is abnormal if the acquired engine speed is lower than a predetermined speed. When the engine 4 has thus failed to be restarted normally by the motor-generator 15, the eco-run ECU 40 sends a second engine restart command to the engine ECU 30 to attempt restart of the engine by the starter motor 20.

In this case, for example, the eco-run ECU 40 detects an output voltage of the first battery 17, and diagnoses the first battery 17 to be abnormal if the detected value is lower than a predetermined value. Even when the eco-run ECU 40 has diagnosed the first battery 17 to be normal, for example, the eco-run ECU 40 acquires the engine speed after a predetermined time has elapsed since the second engine restart command is sent based on an input signal from the engine speed sensor 31, and diagnoses the starter motor 20 or the like to be abnormal if the acquired engine speed is lower than a predetermined speed. When the engine 4 has thus failed to be restarted by the starter motor 20, too, the eco-run ECU 40 sends a third or fourth engine restart command to the engine ECU 30 to attempt restart of the engine by ignition start or push start, in other words, attempt restart of the engine in a manner not dependent on the engine restart system that is composed mainly of electronic components.

To put it the other way around, that the determination criteria are more stringent as the cumulative number of times of in-motion engine stop in one trip is smaller means that the determination criteria are less stringent as the cumulative number of times of in-motion engine stop in one trip is larger. Accordingly, after the engine restart system is diagnosed to be normal at the time of the first engine restart, the frequency of in-motion engine stop increases as the driver gets more used to the engine 4 stopping while the vehicle is moving, which contributes to improvement in drivability and fuel efficiency.

The automatic stop permit conditions have set lower limit values. The determination criteria do not become unlimitedly less stringent as the cumulative number of times of in-motion engine stop in one trip increases; instead, the automatic stop permit conditions are not met unless the inter-vehicle distance etc. are not shorter than a predetermined minimum distance and the gradient of a road is not larger than a predetermined maximum gradient.

The driver usually gets more used to the engine 4 stopping while the vehicle is moving, as the driver has more experience of in-motion engine stop. Thus, it is preferable to set the automatic stop permit conditions such that the determination criteria are relatively stringent when the driver is not used to driving the vehicle 1, and to set the automatic stop permit conditions such that the determination criteria are relatively less stringent as the driver gets more used to driving the vehicle 1, to thereby achieve improvement in drivability and fuel efficiency.

In this embodiment, therefore, the eco-run ECU 40 is configured to set the automatic stop permit conditions for the second and subsequent automatic engine stop in one trip such that the determination criteria are more stringent as the total number of times of in-motion automatic engine stop over a period from when the vehicle 1 was new to the present time is smaller.

If the eco-run ECU 40 is thus configured, the total number of times of in-motion engine stop is reflected for in-motion engine stop among the second and subsequent automatic engine stop in one trip. Accordingly, the determination criteria for the same k-time (k is a positive integer) in-motion engine stop in one trip are relatively more stringent if the vehicle is newer. Thus, while it is possible to avoid giving anxiety to a driver who is not used to driving the vehicle 1, the determination criteria become relatively less stringent as the driver gets more used to driving the vehicle 1, which contributes to improvement in drivability and fuel efficiency.

However, the total number of times of in-motion engine stop is not reflected for the first automatic engine stop at the time of which the engine restart system is diagnosed, since the relation that the driver gets more used to in-motion engine stop as the driver has more experience thereof does not apply here. Therefore, in accordance with the principle, the determination criteria are relatively stringent for the first automatic engine stop. Thus, it is possible to safely diagnose whether the engine restart system is normal or abnormal without giving the driver anxiety.

Figure 5:
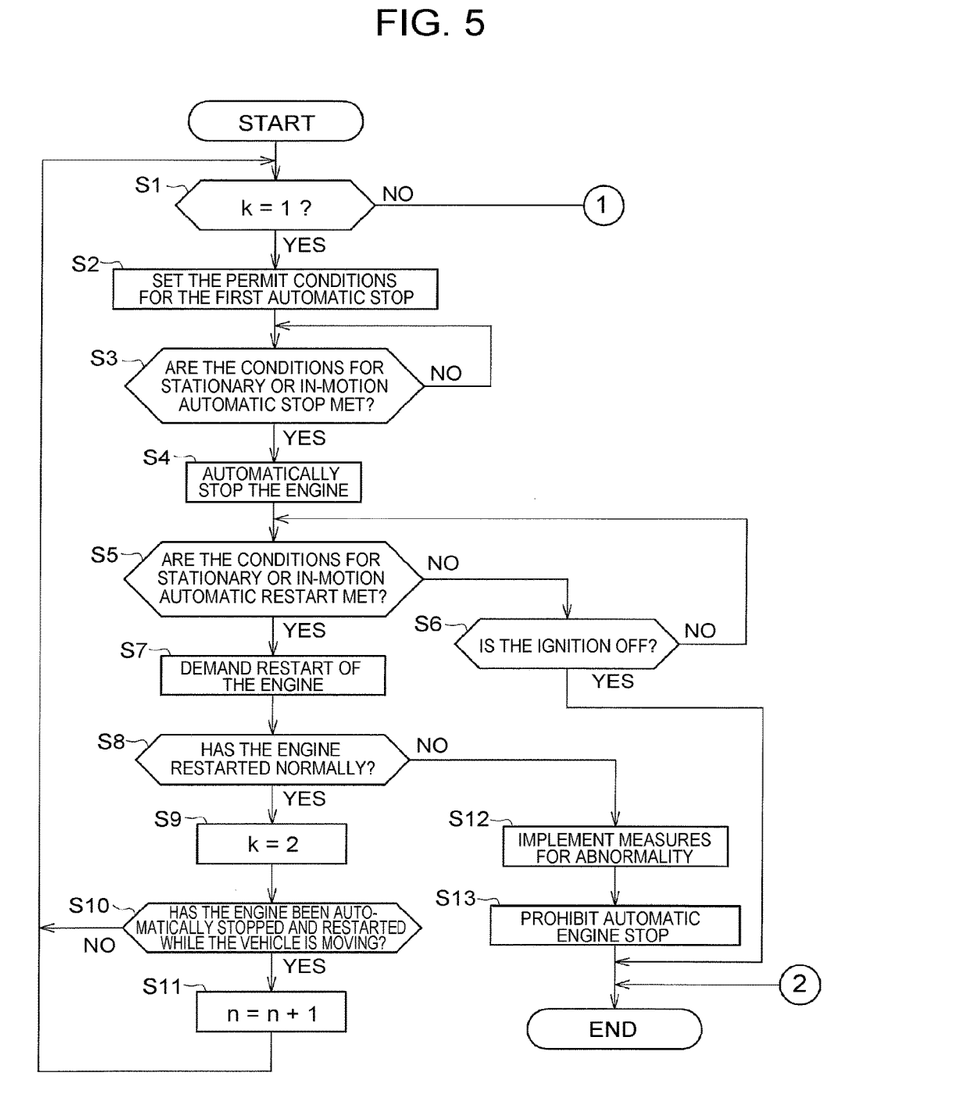
FIG. 5 is a view showing a first half of a flowchart of a process of diagnosing whether an engine restart system is normal or abnormal.
Figure 6:
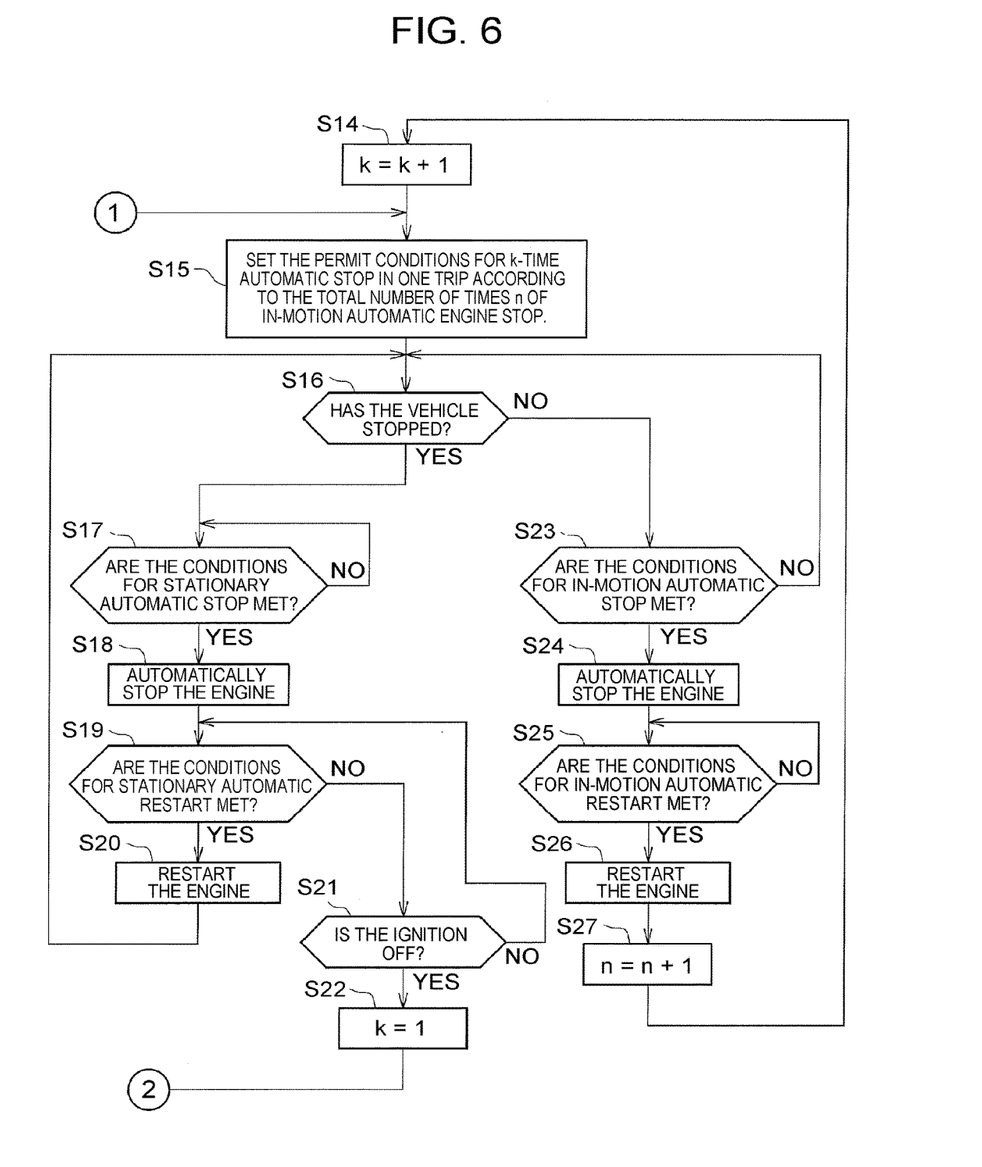
FIG. 6 is a view showing a latter half of the flowchart of the process of diagnosing whether the engine restart system is normal or abnormal.

Next, an overall flow of control executed by the engine ECU 30 and the eco-run ECU 40 will be described with reference to the flowchart shown in FIG. 5 and FIG. 6. FIG. 5 and FIG. 6 respectively show two parts of the flowchart, and these two parts are continuous with each other at the points indicated by the circled numbers. The process on this flowchart is executed when the driver turns on the eco-run switch 41, and is started almost at the same time as the ignition is turned on.

First, in step S1, the eco-run ECU 40 determines whether the cumulative number of times k of in-motion engine stop in one trip is 1, and if the determination result in step S1 is YES, the eco-run ECU 40 proceeds to step S2. The cumulative number of times k of in-motion engine stop in one trip is reset (set to 1) when the ignition is turned off, so that the determination result in step S1 immediately after the start of the process is always YES.

In the next step 2, the eco-run ECU 40 calculates the predetermined distance used as the determination criteria for the inter-vehicle distance etc. based on the control map shown in FIG. 3, and calculates the predetermined gradient based on the control map shown in FIG. 4. Thus, the eco-run ECU 40 sets the permit conditions for the first automatic stop, and then proceeds to step S3. Since the cumulative number of times k of in-motion engine stop in one trip is 1, the automatic stop permit conditions set in step S2 are set such that the determination criteria are stringent as described above.

In the next step S3, the eco-run ECU 40 determines whether the conditions for stationary or in-motion automatic stop are met. The determination in step S3 is repeated until an affirmative result is produced. If the determination result in step S3 is YES, for example, when (b) the accelerator operation amount detected by the accelerator position sensor 33 is zero, (c) the states of charge SOC of the first and second batteries 17, 18 detected by the first and second battery sensors 44, 45 meet the required levels, (d) the detection result of the MC pressure sensor 43 shows that the brake is applied, and (e) the vehicle speed detected by the vehicle speed sensor 32 is 0 km/h, the eco-run ECU 40 determines that the conditions for stationary automatic stop are met, and proceeds to step S4.

On the other hand, when the automatic stop permit conditions are met in addition to the automatic stop execution conditions, i.e., when both the conditions that the inter-vehicle distance etc. corresponding to the current vehicle speed acquired based on input signals from the vehicle speed sensor 32 and the ADAS 50 are not shorter than the predetermined distance, and that the road gradient corresponding to the current vehicle speed acquired based on input signals from the vehicle speed sensor 32 and the inclination sensor 42 is not larger than the predetermined gradient, are met in addition to both the conditions that (B) the accelerator operation amount detected by the accelerator position sensor 33 is zero, and that (C) the states of charge SOC of the first and second batteries 17, 18 detected by the first and second battery sensors 44, 45 meet the required levels, the eco-run ECU 40 determines that the conditions for in-motion automatic stop are met, and proceeds to step S4.

In the next step S4, the eco-run ECU 40 sends an engine stop command to the engine ECU 30. Accordingly, the engine ECU 30 disengages the clutch 9 to disconnect the engine 4 and the driving wheels 7, and executes fuel cut control of stopping fuel supply to the combustion chamber of the engine 4. Then, the eco-run ECU 40 proceeds to step S5.

In the next step S5, the eco-run ECU 40 determines whether the conditions for stationary or in-motion automatic restart are met. If the determination result in step S5 is NO, the eco-run ECU 40 proceeds to step S6. In step S6, the eco-run ECU 40 determines whether the ignition has been turned off while the vehicle is stationary and automatic engine stop is in effect, for example. If the determination result in step S6 is YES, one trip ends, so that the eco-run ECU 40 ends the process. On the other hand, if the determination result in step S6 is NO, the eco-run ECU 40 returns to step S5 and repeats the determination of whether the conditions for stationary or in-motion automatic restart are met.

If the determination result in step S5 is YES, for example, if the accelerator pedal is pressed and the brake pedal is not pressed in the case of stationary automatic engine stop, and if the accelerator pedal is pressed in the case of in-motion engine stop, the eco-run ECU 40 determines that the automatic restart conditions are met, and proceeds to step S7.

In the next step S7, the eco-run ECU 40 demands the engine ECU 30 to restart the engine 4. Specifically, the eco-run ECU 40 sends a first engine restart command to the engine ECU 30 to demand the motor-generator 15 to be driven, and proceeds to step S8.

In the next step S8, the eco-run ECU 40 determines whether the engine has restarted normally, in other words, whether the engine restart system is normal or abnormal. Specifically, if an output voltage value of the second battery 18 is lower than the predetermined value, the eco-run ECU 40 diagnoses the second battery 18 to be abnormal, and if the engine speed after a predetermined time has elapsed since the first engine restart command is sent is lower than the predetermined speed, the eco-run ECU 40 diagnoses the motor-generator 15 or the like to be abnormal.

If the determination result in step S8 is YES, the eco-run ECU 40 regards the engine restart system as normal and proceeds to step S9. In step S9, the eco-run ECU 40 sets the cumulative number of times k of in-motion engine stop in one trip to 2, and then proceeds to step S10. It is important for the first automatic engine stop and restart that whether the engine restart system is normal or abnormal is diagnosed in a safe situation, such as while the vehicle is stationary, or moving under stringent conditions. Therefore, in step S9, the cumulative number of times k of in-motion engine stop in one trip is set to 2 even when the first automatic engine stop and restart are stationary automatic stop and restart.

In the next step S10, the eco-run ECU 40 determines whether the automatic engine stop in step S4 and the engine restart in step S8 were in-motion automatic stop and restart. If the determination result in step S10 is YES, the eco-run ECU 40 proceeds to step S11. In step S11, the eco-run ECU 40 adds 1 to the total number of times n (n is a positive integer) of in-motion engine stop over a period from when the vehicle 1 was new to the present time, and then returns to step S1. On the other hand, if the determination result in step S10 is NO, i.e., the automatic engine stop was stationary automatic engine stop, the eco-run ECU 40 returns to step S1 without increasing the total number of times n.

If the determination result in step S8 is NO, in other words, if the eco-run ECU 40 diagnoses the second battery 18, the motor-generator 15, or the like to be abnormal, the eco-run ECU 40 proceeds to step S12. In step S12, the eco-run ECU 40 implements measures for abnormality, and then proceeds to step S13. Specifically, the eco-run ECU 40 sends a second engine restart command to the engine ECU 30 to attempt restart of the engine 4 by the starter motor 20. In this case, if the output voltage value of the first battery 17 is lower than the predetermined value, the eco-run ECU 40 diagnoses the first battery 17 to be abnormal, and if the engine speed after a predetermined time has elapsed since the second engine restart command is sent is lower than the predetermined speed, the eco-run ECU 40 diagnoses the starter motor 20 or the like to be abnormal. If the starter motor 20 or the like is thus also abnormal, the eco-run ECU 40 sends a third or fourth engine restart command to the engine ECU 30 to attempt restart of the engine 4 by ignition start or push start.

In the next step S13, the eco-run ECU 40 prohibits automatic engine stop, and then ends the process. Thus, if the engine restart system is abnormal, the eco-run ECU 40 prohibits subsequent automatic engine stop to ensure safety, even when the engine 4 can be restarted by the starter motor 20 etc. The diagnostic result of abnormality of the engine restart system is reported to the driver through an indicator (not shown) provided on an instrument panel, for example.

Next, after the engine 4 is restarted normally (the determination result in step S8 is YES), in other words, after the engine restart system is diagnosed to be normal, if the eco-run ECU 40 returns to step S1, the determination result in step S1 is NO, as the cumulative number of times k has been set to 2 in step S9, so that the eco-run ECU 40 proceeds to step S15.

In the next step S15, the eco-run ECU 40 calculates the predetermined distance used as the determination criteria for the inter-vehicle distance etc. and calculates the predetermined gradient according to the total number of times n of in-motion engine stop that is updated in step S11, and to the cumulative number of times k of in-motion engine stop in one trip that is updated in step S9. Thus, the eco-run ECU 40 sets the permit conditions for k-time (e.g., second) automatic stop in one trip, and then proceeds to step S16. As the cumulative number of times k of in-motion engine stop in one trip is 2, the automatic stop permit conditions set in step S15 are set such that the determination criteria are less stringent than those of the automatic stop permit conditions set in step S2.

In the next step S16, the eco-run ECU 40 determines whether the vehicle 1 has stopped based on the vehicle speed detected by the vehicle speed sensor 32. If the determination result in step S16 is YES, the eco-run ECU 40 proceeds to step S17.

In the next step S17, the eco-run ECU 40 determines whether the conditions for stationary automatic stop are met. The determination in step S17 is repeated until an affirmative result is produced. When the determination result becomes YES, the eco-run ECU 40 proceeds to step S18. In step S18, the eco-run ECU 40 sends an engine stop command to the engine ECU 30. Accordingly, the engine ECU 30 disengages the clutch 9 to disconnect the engine 4 and the driving wheels 7, and executes fuel cut control of stopping fuel supply to the combustion chamber of the engine 4.

In the next step S19, the eco-run ECU 40 determines whether the conditions for stationary automatic restart are met. If the determination result in step S19 is NO, the eco-run ECU 40 proceeds to step S21. In step S21, the eco-run ECU 40 determines whether the ignition has been turned off while the vehicle is stationary and automatic engine stop is in effect, for example. If the determination result in step S21 is YES, one trip ends. In step S22, the eco-run ECU 40 resets (sets to 1) the cumulative number of times k of in-motion engine stop in one trip, and ends the process. On the other hand, if the determination result in step S21 is NO, the eco-run ECU 40 returns to step S19, and repeats the determination of whether the conditions for stationary automatic restart are met.

If the determination result in step S19 is YES, the eco-run ECU 40 sends a first engine restart command to the engine ECU 30 to drive the motor-generator 15. In this case, as the driver has not experienced in-motion engine stop, for example, the eco-run ECU 40 returns to step S16 while retaining the permit conditions for the second automatic stop in one trip.

On the other hand, if the determination result in step S16 is NO, the eco-run ECU 40 proceeds to step S23. In the next step S23, the eco-run ECU 40 determines whether the conditions for in-motion automatic stop are met based on the permit conditions for k-time (e.g., second) automatic stop in one trip that are updated in step S15. If the determination result in step S23 is NO, the eco-run ECU 40 returns to step S16, and repeats the determination in step S23 unless the vehicle 1 stops.

When the determination result in step S23 becomes YES, the eco-run ECU 40 proceeds to step S24. In step S24, the eco-run ECU 40 sends an engine stop command to the engine ECU 30. Accordingly, the engine ECU 30 allows the vehicle 1 to coast by disengaging the clutch 9 to disconnect the engine 4 and the driving wheels 7, and executing fuel cut control of stopping fuel supply to the combustion chamber of the engine 4.

In the next step S25, the eco-run ECU 40 determines whether the conditions for in-motion automatic restart are met. The determination in step S25 is repeated until an affirmative result is produced. When the determination result becomes YES, the eco-run ECU 40 proceeds to step S26. In step S26, the eco-run ECU 40 sends a first engine restart command to the engine ECU 30 to drive the motor-generator 15, and then proceeds to step S27.

In the next step S27, the eco-run ECU 40 adds 1 to the total number of times n of in-motion engine stop over a period from when the vehicle 1 was new to the present time. In this case, the driver has also experienced in-motion engine stop during one trip, and therefore the eco-run ECU 40 proceeds to step S14 to newly set the cumulative number of times k of in-motion engine stop in one trip. In the next step S14, the eco-run ECU 40 adds 1 to the cumulative number of times k of in-motion engine stop in one trip, and then proceeds to step S15. In step S15, the eco-run ECU 40 sets the permit conditions for k-time (e.g., third) automatic stop in one trip.

To make the control procedure easier to understand, it is shown in this flowchart that the measures for abnormality are implemented only at the time of the first engine restart. However, also for the second and subsequent engine restart after the engine restart system is determined to be normal, if the engine 4 fails to be restarted by the motor-generator 15 that is the principal restart means in step S20 or step S26, the eco-run ECU 40 tries to restart the engine 4 by another restart means.

As has been described above, according to this embodiment, when the eco-run ECU 40 determines that the automatic stop conditions are met, the engine is automatically stopped for the first time regardless of whether the vehicle is stationary or moving. This makes it possible to execute "free-running S&S control" even when a situation where the vehicle 1 stops does not arise for some time after the vehicle 1 starts moving, which contributes to improvement in fuel efficiency.

The automatic stop permit conditions are set such that the determination criteria are more stringent as the cumulative number of times of in-motion engine stop in one trip is smaller. Thus, it is possible to safely diagnose whether the engine restart system is normal or abnormal, without giving the driver anxiety, in a situation where the inter-vehicle distance etc. are sufficiently long and the road gradient is gentle.

The determination criteria become less stringent as the cumulative number of times of in-motion engine stop in one trip increases. Accordingly, after the engine restart system is diagnosed to be normal at the time of the first engine restart, the frequency of automatic engine stop increases as the driver gets more used to the engine stopping while the vehicle is moving, which contributes to improvement in drivability and fuel efficiency.

The total number of times of in-motion engine stop is reflected for the second and subsequent automatic engine stop in one trip. Thus, it is possible to avoid giving anxiety to a driver who is not used to driving the vehicle 1, as well as to achieve improvement in drivability and fuel efficiency when the driver has gotten used to driving the vehicle 1.

The present disclosure is not limited to the above embodiment, but can be implemented in various other forms without departing from the gist or main features thereof. Therefore, embodiments other than the above embodiment will be described below.

In the above embodiment, the present disclosure is applied to the vehicle 1 that can automatically restart the engine 4 by the plurality of restart means. However, the present disclosure is not limited to this example, and may be applied to a vehicle that automatically restarts the engine 4 by single restart means. In this case, although the engine 4 cannot be automatically restarted when the engine restart system is diagnosed to be abnormal, the determination criteria of the permit conditions for the first automatic stop are set to be stringent. Thus, it is possible to allow the driver to have enough time to pull over to the shoulder in a limp home mode, for example, by informing the diagnostic result to the driver through an indicator etc. It is therefore possible, as in the above embodiment, to secure safety and avoid giving the driver anxiety.

In the above embodiment, the automatic stop permit conditions include that the distance between the own vehicle 1 and a peripheral object present around the own vehicle 1 is not shorter than the predetermined distance, and that the gradient of a road on which the own vehicle 1 is currently moving is not larger than the predetermined gradient. However, the automatic stop permit conditions are not limited to these examples, and may include that the speed of the own vehicle 1 relative to a peripheral object is not higher than a predetermined speed. In this case, it is preferable that the gradient be set to be smaller as the cumulative number of times of in-motion automatic engine stop in one trip is smaller.

In the above embodiment, the present disclosure is applied to an FR vehicle. However, the present disclosure is not limited to this example, and may be applied to a front-engine, front-wheel-drive (FF) vehicle, for example.

In the above embodiment, the present disclosure is applied to the vehicle 1 that has a gasoline engine as the engine 4. However, the present disclosure is not limited to this example, and may be applied to a vehicle having a diesel engine, for example, if ignition start is not used as restart means.

In the above embodiment, the present disclosure is applied to the vehicle 1 that has a multistage transmission as the automatic transmission 5. However, the present disclosure is not limited to this example, and may be applied, for example, to a vehicle having a manual transmission, or a vehicle having a continuously variable transmission such as a belt-driven transmission.

In the above embodiment, the clutch 9 that connects and disconnects the engine 4 and the driving wheels 7, 7 is provided independently of the automatic transmission 5.

However, the present disclosure is not limited to this example, and the clutch 9 may be, for example, a clutch that constitutes a part of the automatic transmission 5. In the case where the automatic transmission is a belt-driven continuously variable transmission, an engaging element included in a publicly known steering reverser may be used as the clutch 9.

Figure 7A:
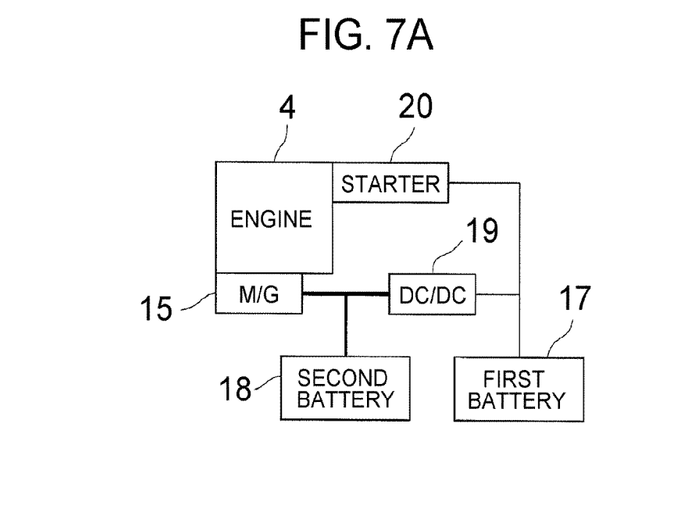
FIG. 7A is a view schematically showing an example of the configuration of the engine restart system.

In the above embodiment, as shown in FIG. 7A, a system having the motor-generator 15, the first and second batteries 17, 18, the DC-DC converter 19, the starter motor 20, etc. is used as the engine restart system. However, the present disclosure is not limited to this example, and a system having another configuration may be used as the engine restart system.

Figure 7B:
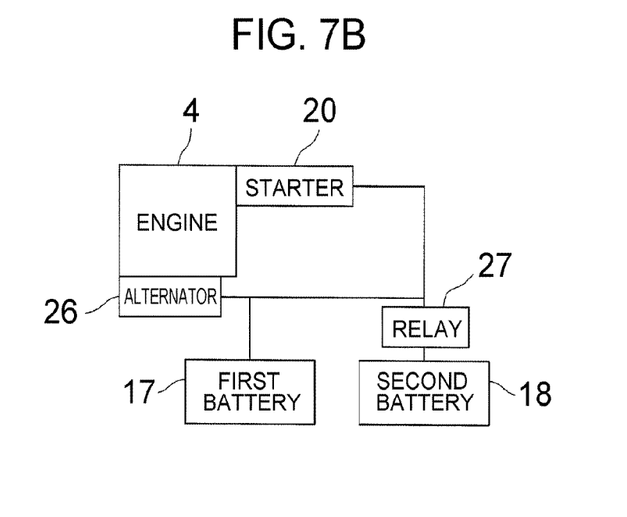
FIG. 7B is a view schematically showing another example of the configuration of the engine restart system.

For example, as shown in FIG. 7B, a system having an alternator 26 as a power generator and a relay switch 27 in place of the motor-generator 15 and the DC-DC converter 19 may be used as the engine restart system, and the starter motor 20 may be used as the principal restart means. In this engine restart system, even when the first battery 17 is diagnosed to be abnormal, it is possible to restart the engine 4 using the starter motor 20 by supplying electric power from the second battery 18 to the starter motor 20 through the relay switch 27. In this case, even when the eco-run ECU 40 has diagnosed the first battery 17 to be normal, the eco-run ECU 40 preferably also diagnoses whether the second battery 18 is normal or abnormal.

Figure 7C:
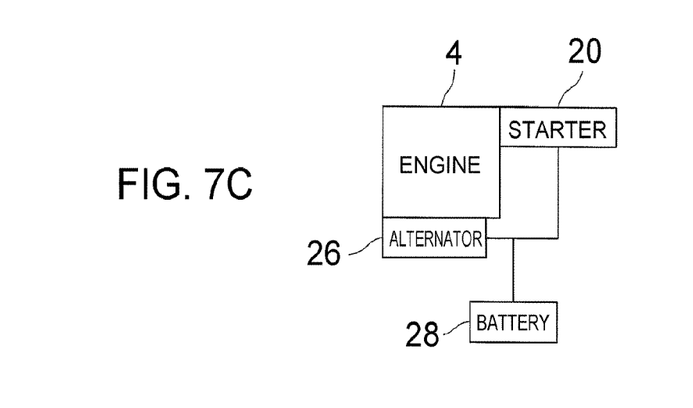
FIG. 7C is a view schematically showing yet another example of the configuration of the engine restart system.

Alternatively, for example, as shown in FIG. 7C, a simple system having the starter motor 20, the alternator 26, and a single battery 28 may be used as the engine restart system.

In the above embodiment, the engine ECU 30 and the eco-run ECU 40 have been shown as the controller 3. However, the present disclosure is not limited to this example, and for example, one ECU may have both the functions of the engine ECU 30 and the eco-run ECU 40.

Thus, the above embodiment is merely an example in every respect, and is not to be interpreted as restrictive. Moreover, all possible modifications and changes belonging to a scope equivalent to the scope of claims are included in the present disclosure.

According to the present disclosure, it is possible to safely diagnose whether the engine restart system is normal or abnormal, without giving the driver anxiety, while achieving improvement in fuel efficiency. Thus, the present disclosure offers great advantages when applied to a controller of a vehicle that can automatically stop and restart the engine while moving.

What is claimed is:

1. A controller for a vehicle, the controller comprising an electronic control unit configured to:
   (i) execute, while the vehicle is stationary or moving, control of automatically stopping an engine upon determining that automatic stop conditions are met, and automatically restarting the engine upon determining that automatic restart conditions are met while automatic engine stop is in effect;
   (ii) diagnose, at a time of engine restart after first automatic engine stop in one trip from turning on to turning off of an ignition, whether a system that automatically restarts the engine is normal or abnormal;
   (iii) include, as the automatic stop conditions for in-motion automatic engine stop, automatic stop execution conditions that are set based on a state of the own vehicle, and automatic stop permit conditions that are set based on a travel environment around the own vehicle; and
   (iv) set the automatic stop permit conditions such that determination criteria are more stringent as a cumulative number of times of in-motion automatic engine stop in the one trip is smaller.

2. The controller for a vehicle according to claim 1, wherein the electronic control unit is configured to set the automatic stop permit conditions for second automatic engine stop and automatic engine stop after the second automatic engine stop in one trip such that determination criteria are more stringent as a total number of times of in-motion automatic engine stop over a period from when the vehicle was new to a present time is smaller.

3. The controller for a vehicle according to claim 1, wherein the automatic stop permit conditions include at least one of the following: a distance between the own vehicle and a peripheral object present around the own vehicle is equal to or longer than a predetermined distance; a speed of the own vehicle relative to a peripheral object present around the own vehicle is equal to or lower than a predetermined speed; and a gradient of a road on which the own vehicle is moving is equal to or smaller than a predetermined gradient.

4. The controller for a vehicle according to claim 1, wherein the automatic stop permit conditions include that a distance between the own vehicle and a peripheral object present around the own vehicle is equal to or longer than a predetermined distance, and the controller sets the predetermined distance to be longer as the cumulative number of times of in-motion automatic engine stop in one trip is smaller.

5. The controller for a vehicle according to claim 1, wherein the automatic stop permit conditions include that a speed of the own vehicle relative to a peripheral object present around the own vehicle is equal to or lower than a predetermined speed, and the controller sets the predetermined speed to be lower as the cumulative number of times of in-motion automatic engine stop in one trip is smaller.

6. The controller for a vehicle according to claim 1, wherein the automatic stop permit conditions include that a gradient of a road on which the vehicle is moving is equal to or smaller than a predetermined gradient, and the controller sets the predetermined gradient to be smaller as the cumulative number of times of in-motion automatic engine stop in one trip is smaller.

7. The controller for a vehicle according to claim 1, further comprising:
   a plurality of restart devices configured to automatically restart the engine, wherein
   the electronic control unit is configured to, when the engine has failed to be restarted by a principal restart device of the plurality of restart devices, attempt restart of the engine by another restart device of the plurality of restart devices.

8. The controller for a vehicle according to claim 7, wherein the restart devices include at least one of the following: a device that starts the engine by using a motor-generator; a device that starts the engine by using a starter motor; a device that starts the engine by injecting fuel into a cylinder of the engine in which a piston of the engine is stopped during an expansion stroke and by igniting the fuel; and a device that starts the engine by using rotary energy of a driving wheel of the vehicle.

9. The controller for a vehicle according to claim 1, further comprising:
   a single restart device configured to automatically restart the engine, wherein the electronic control unit is configured to inform a diagnostic result of whether or not the automatic stop conditions are met to a driver of the vehicle.

10. The controller for a vehicle according to claim 9, wherein the restart device includes at least one of the following: a device that starts the engine by using a motor-generator; a device that starts the engine by using a starter motor; a device that starts the engine by injecting fuel into a cylinder of the engine in which a piston of the engine is stopped during an expansion stroke and by igniting the fuel; and a device that starts the engine by using rotary energy of a driving wheel of the vehicle.

* * * * *